Patented June 11, 1940

2,203,818

UNITED STATES PATENT OFFICE 2,203,818

AZO DYESTUFFS

Richard Fleischhauer and Heinrich Ritter, Frankfort - on - the - Main - Fechenheim, Germany, assignors to General Aniline & Film Corporation, a corporation of Delaware No Drawing. Application May 12, 1938, Serial No. 207,506. In Germany May 18, 1937

3 Claims. (Cl. 260—198)

This invention relates to azo dyestuffs, more particularly to those of the general formula:

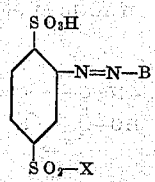

wherein X stands for a member selected from the group consisting of alkyl, cycloalkyl and aryl groups, aryl meaning a radicle of the benzene series and B standing for a member selected from the group consisting of radicles of the naphthalene, pyrazolone, hydroxycarbazole and hydroxydiphenylene oxide series.

The new dyestuffs are prepared by combining the diazo compounds of aromatic amines of the general formula:

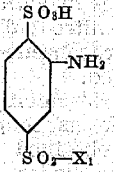

wherein $X_1$ stands for a member selected from the group consisting of alkyl, cycloalkyl and aryl groups, aryl meaning a radicle of the benzene series, with coupling components selected from the group consisting of compounds of the naphthalene, pyrazolone, hydroxycarbazole and hydroxydiphenylene oxide series.

The new dyestuffs thus obtained dye wool and silk various shades, especially very clear red to orange to yellow shades of good fastness properties.

In order to further illustrate our invention the following examples are given, the parts being by weight and all temperatures in degrees centigrade.

Example 1

26.5 parts of 1-aminobenzene-3-ethylsulfone-6-sulfonic acid are dissolved in water with the addition of sodium carbonate. Then the necessary amount of sodium nitrite is added and the mixture is allowed to run into a mixture of ice and hydrochloric acid. The suspension of the diazo compound formed is added, while cooling, to a solution of 29 parts of 2-acetylamino-5-hydroxy-naphthalene-7-sulfonic acid containing an excess of sodium bicarbonate. The dyestuff thus obtained of the formula:

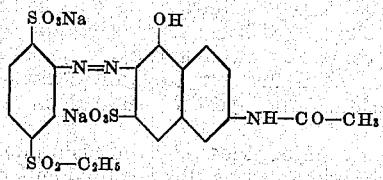

is separated and dried. It is an orange-red powder, soluble in water and dyeing wool and silk very yellowish orange shades of very good fastness to light and seawater and good fastness to washing and perspiration. The dyestuff has a good levelling power and is fast to alkalies.

As a by-product there is formed a little amount of an orange dyestuff which is more soluble in water and the shade of which is turned to dark-red in the presence of alkalies.

By employing 1-hydroxynaphthalene-3-sulfonic acid as coupling component a dyestuff is obtained which yields similar shades of likewise very good fastness to light, whereas the dyestuff obtained by using 2-($\beta$-chloro-propionylamino)-5-hydroxynaphthalene-7-sulfonic acid is distinguished by a somewhat better fastness to washing and perspiration.

Dyestuffs which yield more yellowish shades are obtained by employing as coupling components 2-hydroxynaphthalene-sulfonic acids, for instance 2-hydroxynaphthalene-6.7- or 8-sulfonic acid or 2-hydroxynaphthalene-6.8-disulfonic acid, whereas more reddish orange shades are obtained by means of dyestuffs which contain as coupling components the radicles of 2-benzoylamino-5-hydroxynaphthalene-7-sulfonic acid or 1-benzoylamino-5-hydroxynaphthalene-7-sulfonic acid.

The 1-aminobenzene-3-ethylsulfone-6-sulfonic acid employed as diazo component for the above example which has hitherto not been described, may be prepared for example in the following manner: 4-chlorothiophenol is ethylated and then converted by oxidation into the corresponding sulfone compound. The 4-chlorophenyl-ethylsulfone obtained is nitrated and then treated with sodium sulfite whereby the 1-nitrobenzene-3-ethylsulfone-6-sulfonic acid is obtained which is reduced to the corresponding amine. The 1-amino-3-ethylsulfone-6-sulfonic acid is easily soluble in solutions of sodium carbonate or acetate and slightly soluble in water or hydrochloric acid. The corresponding diazo compounds are slightly soluble in water.

Example 2

29.3 parts of 1-aminobenzene-3-n-butylsulfone-6-sulfonic acid are diazotized and the suspension of the diazo compound formed is allowed to run into a solution of 29 parts of 1-acetylamino-5-hydroxynaphthalene-7-sulfonic acid containing an excess of sodium acetate. Then the mixture is stirred for some hours. When the combination is complete, the dyestuff formed of the formula:

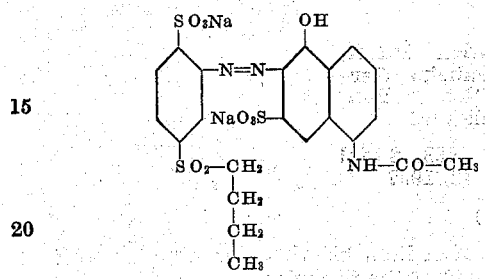

is precipitated by the addition of sodium chloride, filtered off and dried. It is a reddish brown powder, soluble in water and dyeing wool orange shades of good fastness to light, seawater and perspiration. The dyestuff has a good levelling power.

The 1-aminobenzene-3-n-butylsulfone-6-sulfonic acid employed as diazo component may be prepared in an analogous manner as described in Example 1 for the manufacture of the diazo component of Example 1.

By employing 2-acetylamino-8-hydroxynaphthalene-6-sulfonic acid or 1-acetylamino-8-hydroxynaphthalene-6-sulfonic acid as coupling component similar dyestuffs are obtained which yield somewhat more reddish orange shades.

Example 3

25.1 parts of 1-aminobenzene-3-methylsulfone-6-sulfonic acid are diazotized and the suspension of the diazo compound formed is combined with a solution of 24 parts of 2-amino-8-hydroxynaphthalene-6-sulfonic acid containing a little amount of mineral acid. The mixture is stirred for some hours, then the dyestuff formed of the formula:

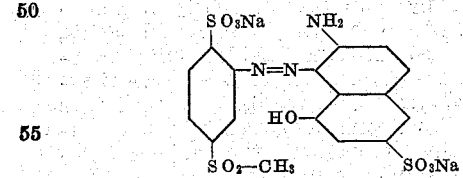

is separated and dried. It is a violettish-brown powder, soluble in water and dyeing wool clear red shades of excellent fastness to light. The dyestuff has a good levelling power.

The analogous dyestuffs prepared by employing 1-aminobenzene-3-ethylsulfone-6-sulfonic acid or 1-aminobenzene-3-benzylsulfone-6-sulfonic acid as diazo components dye wool similar shades which are distinguished by a somewhat better fastness to washing and perspiration.

Example 4

29.3 parts of 1-aminobenzene-3-n-butylsulfone-6-sulfonic acid are diazotized and the diazo compound obtained is combined with a solution of 26 parts of 2-methylaminonaphthalene-7-sulfonic acid containing a little amount of mineral acid. The sodium salt of the dyestuff formed of the formula:

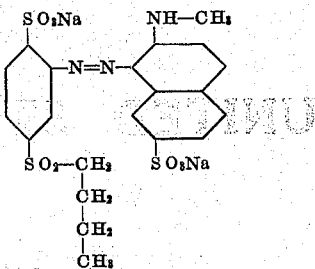

is, when dry, a red powder, soluble in water and dyeing wool bright scarlet shades.

Example 5

31.3 parts of 1-aminobenzene-3-phenylsulfone-6-sulfonic acid are diazotized and the diazo compound formed is combined with a solution of 25 parts of 1-(2',5'-diachlorophenyl)-3-methyl-5-pyrazolone containing an excess of sodium carbonate. The dyestuff formed of the formula:

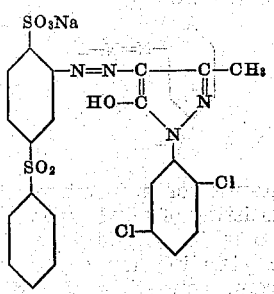

is separated and dried. It is a yellow powder, soluble in water and dyeing wool clear greenish yellow shades of very good fastness to light.

The 1-aminobenzene-3-phenylsulfone-6-sulfonic acid employed as diazo component may be prepared for example by acting with sodium sulfite on 4-chloro-3-nitro-1-diphenylsulfone and reducing the 1-nitrobenzene-3-phenylsulfone-6-sulfonic acid obtained.

By employing 1-(2'-chloro-5'-sulfophenyl)-3-methyl-5-pyrazolone as coupling component a similar dyestuff is obtained which yields somewhat brighter yellow shades.

By replacing the above diazo component by the corresponding amount of 1-aminobenezene-3-cyclohexylsulfone-6-sulfonic acid, dyestuffs of similar properties are obtained.

Example 6

26.5 parts of 1-aminobenzene-3-ethylsulfone-6-sulfonic acid are diazotized and the diazo compound formed is combined with a solution of 14.4 parts of 2-hydroxynaphthalene containing an excess of sodium hydroxide. The dyestuff formed of the formula:

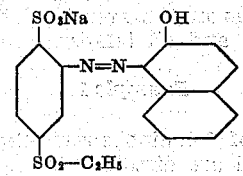

is precipitated by the addition of sodium bicarbonate, filtered off and dried. It is an orange-brown powder, soluble in water and dyeing wool from an acid bath orange shades of good fastness properties.

By employing 2-hydroxycarbazole or 3-hydroxydiphenyleneoxide as coupling components, dyestuffs are obtained which dye wool yellowish to reddish brown shades.

We claim:

1. The azo dyestuffs of the general formula:

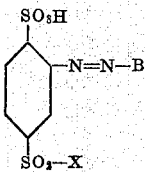

wherein X stands for a member selected from the group consisting of alkyl, cycloalkyl and aryl groups of the benzene series, and B stands for the radicle of a coupling component selected from the group consisting of compounds of the naphthalene, pyrazolone, hydroxycarbazole and hydroxydiphenylene oxide series, which dyestuffs dye wool and silk various shades of good fastness properties.

2. The azo dyestuff of the formula:

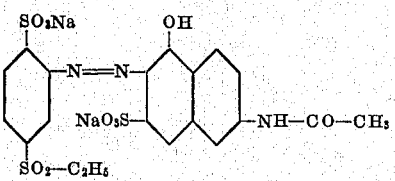

which dyestuff is an orange-red powder, soluble in water and dyeing wool and silk very yellowish-orange shades of very good fastness to light and seawater and good fastness to washing and perspiration.

3. The azo dyestuff of the formula:

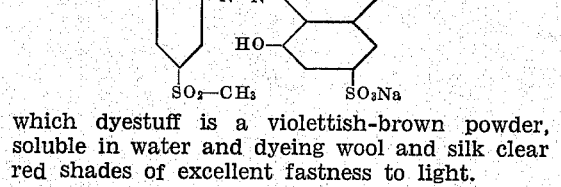

which dyestuff is a violettish-brown powder, soluble in water and dyeing wool and silk clear red shades of excellent fastness to light.

RICHARD FLEISCHHAUER.
HEINRICH RITTER.